Dec. 22, 1964     H. D. CRONIN     3,161,955
BLADE ASSEMBLY
Filed Dec. 3, 1962
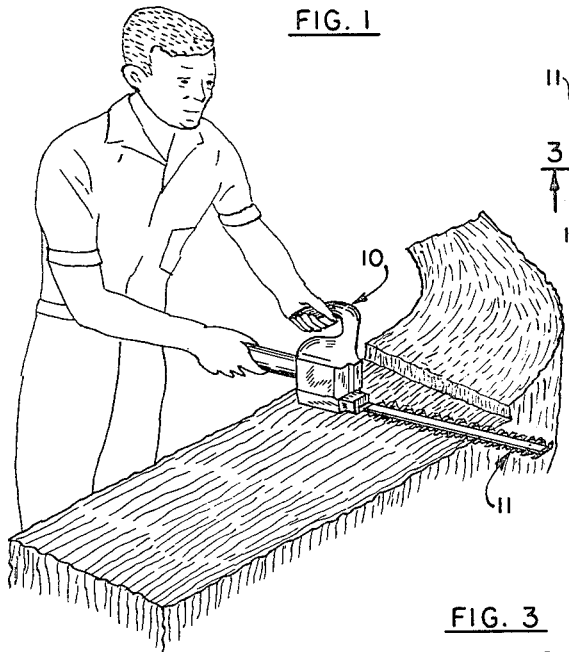
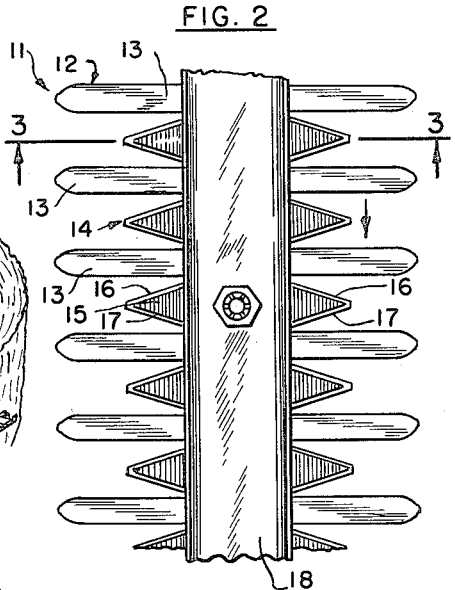
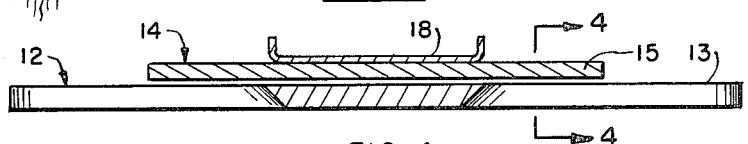
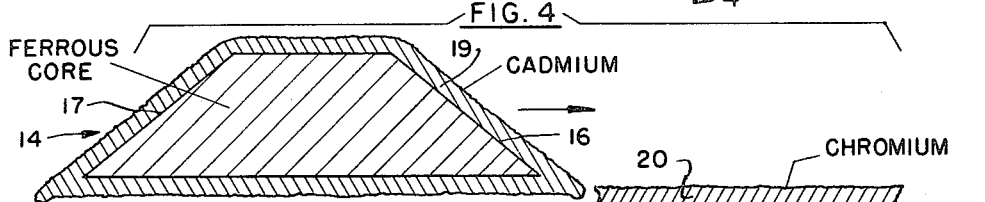
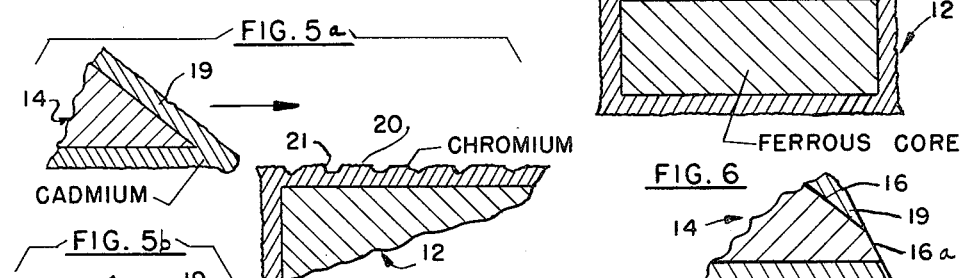
INVENTOR
HERBERT D. CRONIN
BY Leonard Bloom
ATTORNEY

United States Patent Office 3,161,955
Patented Dec. 22, 1964

3,161,955
BLADE ASSEMBLY
Herbert D. Cronin, Towson, Md., assignor to The Black and Decker Manufacturing Company, Towson, Md., a corporation of Maryland
Filed Dec. 3, 1962, Ser. No. 241,975
3 Claims. (Cl. 30—225)

The present invention relates to a blade assembly, and more particularly, to an anti-friction blade assembly, one which has an inherent resistance against the formation of corrosion or rust.

Broadly stated, the present invention relates to a shearing apparatus, wherein at least one pair of substantially flat surfaces, each of which has a ferrous core, are adapted to be brought into intimate physical contact with each other; and more particularly, the invention relates to a method for minimizing the degree of sliding or rubbing friction between the surfaces, while simultaneously resisting the formation of corrosion or rust on the surfaces. This method comprises providing the surfaces with respective outer layers of dissimilar metals, at least one of which is above "triple valence" iron in the electromotive force series table. An electro-depositing means, such as plating, may be used to provide each of the surfaces with its respective outer layer; and preferably, one of the platings used is chromium, while the other is cadmium.

More specifically, the present invention relates to a blade assembly comprising a pair of blades, each of which has a ferrous core; and one of the blades is plated with an outer layer of chromium, while the other blade is plated with an outer layer of cadmium. The blades each have respective substantially flat surfaces that are adapted to slide along or rub against one another; and inasmuch as this rubbing occurs between dissimilar metals, in this case chromium and cadmium, a lesser degree of frictional resistance or "drag" is encountered in the overall blade assembly. The blade assembly is especially adapted for use in conjunction with a portable electric hedge trimmer; and the one blade which is plated with chromium, comprises a stationary blade having a plurality of uniformly-shaped non-cutting teeth formed thereon, the purpose of which is to "comb" the twigs or other growth of a hedge or similar foliage. The other blade, which is plated with cadmium, comprises a movable blade having a plurality of uniformly shaped cutting teeth, each of which has respective cutting edges formed thereon. These cutting edges on the movable blade will require an initial sharpening, as well as a resharpening from time to time, thereby exposing the ferrous core of the movable blade to corrosion or rust due to moisture or dampness; and it will of course be appreciated that such environmental conditions are frequently found in hedges and other growth upon which the particular blade assembly herein disclosed is generally intended to be used. However, because cadmium is a less "noble" metal than iron, that is to say, it is above "triple valence" iron in the electromotive force series table, it will tend to go into solution and be "lost" in preference to the iron in any electrolytic action generated between cadmium and iron by reason of moisture or dampness in the atmosphere. Consequently, the iron or ferrous core of the movable blade will be protected at all times by the "sacrificial" cadmium upon which it is deposited, thereby inhibiting the formation of rust or corrosion on the movable blade. The stationary blade, on the other hand, is completely plated with chromium and does not have cutting edges formed thereon; consequently, its ferrous core is not normally intended to become exposed to the atmosphere, and hence the problem of inhibiting corrosion on the stationary blade is not nearly as pronounced as it is with regard to the movable or cutting blade. Moreover, the cadmium on the movable blade has the inherent tendency to "smear," and this is valuable in this instance because the cadmium will tend to fill up any microscopic pockets or asperities normally found in a commercial-type of chromium plating thereby serving as a further protection to the ferrous core of the stationary blade. Moreover, the combination of dissimilar metals, one chromium and the other cadmium, results in a pleasing appearance, one that is obtained at a relatively low cost; and in summary then, the present invention has four definite and simultaneously achieved benefits: one, a reduction in friction; two, a resistance against corrosion or rust; three, a pleasing and attractive appearance; and four, a relatively low unit cost, one which is practical from a commercial standpoint.

These and other objects of the present invention will become apparent with a reading of the following specification, taken in conjunction with the enclosed drawing, in which:

FIGURE 1 is a perspective view of a typical power-operated device in usage, wherein the blade assembly may be made in accordance with the teachings of the present invention;

FIGURE 2 is an enlarged plan view of a portion of the blade assembly illustrated in the device of FIGURE 1, showing the movable cutting blade approximately midway of its stroke;

FIGURE 3 is a sectional view taken along the lines 3—3 of FIGURE 2, and enlarged over the scale of FIGURE 2, showing the movable blade adapted to reciprocate between the stationary blade and a blade cover plate;

FIGURE 4 is a sectional view taken along the line 4—4 of FIGURE 3, and greatly enlarged over the scale of FIGURE 3, showing a cadmium plating on the ferrous core of the movable blade, and further showing a chromium plating on the ferrous core of the stationary blade;

FIGURE 5a and 5b are sequence views corresponding to a portion of FIGURE 4, but further enlarged in scale, and showing how the cadmium, which is plated on the movable blade, will tend to "smear" over the stationary blade and to fill up the microscopic cracks or asperities that are normally found in a commercial-type of chromium plating, such as is used on the stationary blade; and FIGURE 6 is a portion of the movable blade of FIGURE 4, showing how a resharpening of the cutting edges on the movable blade will normally expose a portion of the ferrous core to atmospheric conditions.

With reference to FIGURE 1, there is illustrated a portable cordless hedge trimmer 10 having a blade assembly 11 which may be made in accordance with the teachings of the present invention. The hedge trimmer 10 is the subject of the co-pending Riley et. al., application Ser. No. 184,904, filed April 3, 1962, entitled "Cordless Electric Hedge Trimmer Assembly," and assigned to the assignee of the present invention, while the particular construction and configuration of the blade assembly itself is the subject of the co-pending Riley et. al., application Ser. No. 237,647, filed November 14, 1962, entitled "Blade Assembly for Portable Power-Operated Hedge Trimmer," and assigned to the assignee of the present invention. However, the teachings of the present invention, it will be appreciated, are equally applicable to a wide variety of power-operated devices or articles, as well as to a wide variety of particular blade assemblies; and the particular form, herein illustrated for clarity of understanding, is only indicative of the broad category of shearing apparatus, in general, to which the teachings and essence of the invention may be readily applied by those skilled in the art.

With this in mind, and with reference to FIGURES 2 and 3, the blade assembly 11 comprises a stationary blade 12 having a series of uniformly shaped non-cutting teeth 13 formed thereon and a movable blade 14, disposed on top of the stationary blade 12, and adapted to reciprocate with respect to it. The movable blade 14 has plurality of uniformly shaped cutting teeth 15 formed thereon, each of which is provided with respective cutting edges 16 and 17. The movable blade 14 is disposed beneath the stationary blade 12 and a blade cover plate 18, which is secured to the stationary blade 12; and a sufficient clearance (in the vertical or transverse direction) is provided between the stationary blade 12 and the blade cover plate 18, so as to accommodate an easy reciprocation of the movable blade 14, yet afford the movable blade 14 an appreciable degree of positive guidance and rigidity.

With reference to FIGURE 4, each of the blade 12 and 14 is manufactured from a good quality, carbon "spring" steel, which from a chemical or metallurgical standpoint, may be designated a "ferrous core" as noted on the drawing. The movable blade 14 is provided with an outer layer of cadmium 19, while the stationary blade 12 is provided with an outer layer of chromium 20. Preferably, each of the outer layers 19 and 20 is formed from a commercial plating process familiar to one skilled in the art; however, other means of electro-depositing the layers on the respective blades, as well as various other methods of chemical or metallurgical bonding, such as thermal diffusion for example, are equally within the concept and scope of the present invention. In their manufacture, the movable blade 14, for example, is first stamped out from suitable stock and is suitably heat treated; then the cutting edges, such as 16 and 17, are ground, and then, the blade is completely plated with cadmium.

Generally stated, and as hereinbefore noted, cadmium is above "triple valence" iron in the electromotive force series table. By way of definition, the electromotive force series table is a list of metals arranged according to their standard electrode potentials, that is to say, it is a list of metals arranged in the decreasing order of their tendencies to pass into ionic form by losing or giving up electrons. In the "Handbook of Chemistry and Physics," Thirty-eighth edition, latest copyright 1956, published by Chemical Rubber Publishing Co. of Cleveland, Ohio, at page 1660, the standard electrode potentials, at 25 degrees centigrade, are given as follows:

| Element | Symbol | Ion | Electrode Potential (at 25° C.) |
|---|---|---|---|
| Chromium | Cr | $Cr^{++}$ | +0.557 |
| Iron ("double valence") | Fe | $Fe^{++}$ | +0.441 |
| Cadmium | Cd | $Cd^{++}$ | +0.401 |
| Iron ("tripple valence") | Fe | $Fe^{+++}$ | +0.045 |

Consequently, the cadmium may be considered as being less "noble" than the iron upon which is deposited, which in our case is "triple valence" iron, and this is important for the following reason: Whenever the cutting edges 16 and 17 on each of the teeth 15 of the movable blade 14 are resharpened, as is usually required from time to time, a portion 16a of the iron or ferrous core is exposed to the atmosphere, see FIGURE 6, and is thereby susceptible to corrosion or rust by reason of dampness or moisture, which is an environmental condition frequently found in hedges or similar foliage. However, in any electrolytic action generated between cadmium and iron, the "sacrificial" cadmium will tend to go into solution and to be "lost" in preference to the iron, thereby protecting the iron core of the movable blade at all times against corrosion or rust. Hence, the cadmium plating on the movable blade 14 tends to maintain the cutting edges sharp, and the movable blade 14 does not become prematurely dull, as might otherwise occur because of corrosive effects.

The stationary blade 12, on the other hand, has a hard-packed commercial-type of chromium plating without any exposed cutting edges formed thereon. Consequently, the ferrous core of the stationary blade 12 is not normally exposed to the atmosphere, and generally, it is only through natural attrition or wear that the chromium plating will be removed from the stationary blade 12.

Naturally, it will be appreciated that the chromium plating, as well as the cadmium plating, will ultimately wear off due to repeated and continuous usage of the blade assembly 11; but this is to be expected and indeed has been taken into account. The respective platings are each formed to a certain thickness, within production limits, so that the wear patterns of both platings are substantially uniform, and this is desirable in contributing to a "balanced wear" of the overall blade assembly.

Moreover, the respective substantially flat surfaces of the blades 12 and 14 are plated with dissimilar metals, in this case chromium and cadmium, which has a desirable tendency to minimize the coefficient of friction in the shearing action between the blades; and this is an important advantage in that the power of the hedge trimmer 10 is not otherwise dissipated in absorbing frictional losses. On the other hand, the usage of similar metals, such as chromium against chromium, has been found to increase frictional losses in the overall blade assembly, and hence the use of similar metals has been deliberately avoided in the present invention. Also, the cadmium has the tendency to "smear"; and this too is desirable, in this instance, for the following reason: A commercially acceptable type of chromium plating, as at 20, normally has a number of microscopic pockets, cracks, or asperities, which in FIGURE 5a are designated as at 21 and are greatly exaggerated for ease of illustration. These microscopic asperities are then filled, as at 21a, by the cadmium which tends to "smear" itself over the chromium plating, thereby further protecting the ferrous core of the stationary blade against corrosion, and hence further enhancing the life and serviceability of the overall blade assembly.

The present invention finds particular utility in those shearing applications wherein the material being cut, as for example wood, has a shearing strength of approximately 30,000 pounds per square inch or less.

In review, the present invention teaches the selection of dissimilar platings of cadmium and chromium on blades having respective ferrous cores, with the cadmium plating being on the movable blade which has the exposed cutting edges, such that the cadmium will protect the ferrous core and maintain the cutting edges free of rust and corrosion and hence sharp. There are two principal advantages: one, and primarily, a protection against corrosion or rust; and two, and secondarily, a reduction of frictional loads. Also, as will be apparent to those skilled in the art, it permits the use of a strong steel as the basic structural material for each blade, hence affords optimum blade strength and life. Moreover, the blade assembly is provided with a pleasing and attractive overall appearance, yet the cost involved is relatively low; and these additional advantages render the application and usage of the present invention feasible and practical from a commercial standpoint.

Obviously, many modifications may be made without departing from the basic spirit of the present invention; and accordingly, within the scope of the appended claims, the invention may be practiced other than has been specifically described.

I claim:

1. A blade assembly comprising:
   (a) a pair of blades, each of which has a ferrous core;
   (b) one of said blades having an outer layer of cadmium; and
   (c) the other of said blades having an outer layer of chromium.

2. A blade assembly as defined in claim 1, wherein:
   (a) said one blade is movable and is plated with the cadmium; and (b) said other blade is stationary and is plated with the chromium.

3. A blade assembly comprising:
(a) a stationary blade having a chromium plating on a ferrous core;
(b) said stationary blade having uniformly-shaped teeth formed thereon;
(c) a movable blade having a cadmium plating on a ferrous core;
(d) said movable blade being disposed on top of said stationary blade and being adapted to reciprocate with respect to it; and
(e) said movable blade having uniformly-shaped cutting teeth formed thereon.

References Cited in the file of this patent
UNITED STATES PATENTS

| | | |
|---|---|---|
| 1,518,622 | Wernlund | Dec. 9, 1924 |
| 2,008,282 | Keen | July 16, 1935 |
| 2,836,401 | Phelan | May 27, 1958 |

FOREIGN PATENTS

| | | |
|---|---|---|
| 115,319 | Australia | June 13, 1940 |